United States Patent
Nakagawa et al.

(10) Patent No.: US 12,018,152 B2
(45) Date of Patent: Jun. 25, 2024

(54) POLYBUTADIENE COMPOSITION AND METHOD FOR PRODUCING SAME

(71) Applicant: ENEOS MATERIALS CORPORATION, Tokyo (JP)

(72) Inventors: Keita Nakagawa, Minato-ku (JP); Kazushi Urayama, Minato-ku (JP); Takuya Sano, Minato-ku (JP); Takato Fukumoto, Minato-ku (JP)

(73) Assignee: ENEOS MATERIALS CORPORATION, Tokyo (JP)

( * ) Notice: Subject to any disclaimer, the term of this patent is extended or adjusted under 35 U.S.C. 154(b) by 220 days.

(21) Appl. No.: 17/290,891

(22) PCT Filed: Dec. 11, 2019

(86) PCT No.: PCT/JP2019/048443
§ 371 (c)(1),
(2) Date: May 3, 2021

(87) PCT Pub. No.: WO2020/122108
PCT Pub. Date: Jun. 18, 2020

(65) Prior Publication Data
US 2022/0002524 A1 Jan. 6, 2022

(30) Foreign Application Priority Data
Dec. 13, 2018 (JP) ................................ 2018-233795

(51) Int. Cl.
| | |
|---|---|
| C08L 9/00 | (2006.01) |
| C08F 4/52 | (2006.01) |
| C08F 4/54 | (2006.01) |
| C08F 136/06 | (2006.01) |
| C08F 295/00 | (2006.01) |

(52) U.S. Cl.
CPC ............... *C08L 9/00* (2013.01); *C08F 4/52* (2013.01); *C08F 4/545* (2013.01); *C08F 136/06* (2013.01); *C08F 295/00* (2013.01); *C08L 2205/025* (2013.01); *C08L 2312/00* (2013.01); *C08L 2314/08* (2013.01)

(58) Field of Classification Search
CPC ........ C08F 295/00; C08F 136/06; C08F 4/52; C08F 4/545
See application file for complete search history.

(56) References Cited

U.S. PATENT DOCUMENTS

| | | |
|---|---|---|
| 10,035,908 B1 | 7/2018 | Luo et al. |
| 2002/0037967 A1 | 3/2002 | Luo |
| 2006/0264560 A1* | 11/2006 | Tanaka ................. C08L 19/006 524/502 |
| 2016/0304707 A1 | 10/2016 | McCauley et al. |

FOREIGN PATENT DOCUMENTS

| | | |
|---|---|---|
| CN | 105814132 A | 7/2016 |
| EP | 1 470 937 A1 | 10/2004 |
| EP | 2 045 287 A1 | 4/2009 |
| EP | 3 009 472 A1 | 4/2016 |
| JP | 59-122531 A | 7/1984 |
| JP | 61-73707 A | 4/1986 |
| JP | 2000-256507 A | 9/2000 |
| JP | 2001-302730 A | 10/2001 |
| JP | 2008-163144 A | 7/2008 |
| JP | 2012214765 A * | 11/2012 |
| JP | 2016-540080 A | 12/2016 |
| JP | 2017-132954 A | 8/2017 |
| JP | 2019-56073 A | 4/2019 |

OTHER PUBLICATIONS

Machine translation of JP-2012214765-A obtained from patentscope (Year: 2012).*
Extended European Search Report issued Dec. 8, 2021 in corresponding European Patent Application No. 19895269.9, 6 pages.
Office Action issued Jun. 7, 2022, in corresponding Taiwanese Patent Application No. 108145575 (with English Translation), 8 pages.
International Search Report issued on Mar. 3, 2020 in PCT/JP2019/048443 filed on Dec. 11, 2019, 3 pages.
Korean Office Action issued on Feb. 10, 2023 in Korean Patent Application No. 10-2021-7013144 (with unedited computer-generated English translation), 8 pages.
Japanese Office Action issued on Jul. 4, 2023 in Japanese Patent Application No. 2020-559277 (with unedited computer-generated English translation), 14 pages.

* cited by examiner

*Primary Examiner* — Kregg T Brooks
*Assistant Examiner* — David R. Foss
(74) *Attorney, Agent, or Firm* — Oblon, McClelland, Maier & Neustadt, L.L.P.

(57) ABSTRACT

A polybutadiene composition which enables the achievement of a rubber material that has excellent crack propagation resistance and a method for producing this polybutadiene composition are provided. A polybutadiene composition is produced by a method that comprises a step Y wherein 1,3-butadiene is polymerized in the presence of 1,2-polybutadiene and a lanthanoid catalyst. A polybutadiene composition which contains 1,2-polybutadiene and 1,4-polybutadiene, and which is obtained by polymerizing 1,3-butadiene in the presence of 1,2-polybutadiene and a lanthanoid catalyst.

8 Claims, No Drawings

POLYBUTADIENE COMPOSITION AND METHOD FOR PRODUCING SAME

CROSS-REFERENCE TO RELATED APPLICATIONS

The present application is based on Japanese Patent Application No. 2018-233795 filed on Dec. 13, 2018, the content of which is incorporated herein by reference.

TECHNICAL FIELD

The present disclosure relates to a polybutadiene composition and a production method therefor. More particularly, the present disclosure relates to a polybutadiene composition containing 1,4-polybutadiene and 1,2-polybutadiene, and to a method for producing the composition.

BACKGROUND ART

A polybutadiene composition containing 1,4-polybutadiene is produced through a method involving cis-1,4-polymerization of 1,3-butadiene in an inert solvent (e.g., a hydrocarbon) in the presence of a catalyst (see, for example, Patent Documents 1 and 2). Patent Documents 1 and 2 disclose production of vinyl-cis-polybutadiene rubber via cis-1,4-polymerization of 1,3-butadiene in the presence of 1,2-polybutadiene and a cobalt-containing catalyst or a nickel-containing catalyst, and subsequent 1,2-polymerization of 1,3-butadiene.

PRIOR ART DOCUMENTS

Patent Documents

Patent Document 1: JP-A-2008-163144
Patent Document 2: JP-A-2017-132954

SUMMARY OF THE INVENTION

Technical Problem

In view of, for example, recent environmental conditions and increased awareness of resource savings and energy savings, a rubber material exhibiting superior resistance to crack growth has been required. Also, demand has arisen for a polybutadiene rubber material exhibiting crack growth resistance superior to that of conventional polybutadiene rubber materials.

In view of the foregoing, an object of the present disclosure is to provide a polybutadiene composition capable of preparing a rubber material exhibiting excellent crack growth resistance, and a method for producing the composition.

Solution to Problem

In order to solve the aforementioned problems, the present disclosure provides a polybutadiene composition, a method for producing the composition, and a crosslinked product, as described below.

[1] A method for producing a polybutadiene composition, the method comprising step Y of polymerizing 1,3-butadiene in the presence of 1,2-polybutadiene and a lanthanoid-containing catalyst.

[2] A polybutadiene composition comprising 1,2-polybutadiene and 1,4-polybutadiene, the polybutadiene composition being produced by polymerizing 1,3-butadiene in the presence of 1,2-polybutadiene and a lanthanoid-containing catalyst.

[3] A crosslinked product produced through crosslinking of a rubber composition containing a polybutadiene composition produced through the production method as recited in [1] above or a rubber composition containing the polybutadiene composition as recited in [2] above.

Effects of the Invention

The polybutadiene composition and production method therefor of the present disclosure can achieve production of a polybutadiene rubber exhibiting excellent crack growth resistance.

DESCRIPTION OF EMBODIMENTS

Embodiments of the present disclosure will next be described in detail. As used herein, the term "to" between two numerical values indicates that the numeric values before and after the term are inclusive as the lower limit value and the upper limit value, respectively.

The polybutadiene composition of the present disclosure is produced by a method including a step of polymerizing 1,3-butadiene in the presence of 1,2-polybutadiene and a lanthanoid-containing catalyst (hereinafter the step may be referred to as "step Y"). According to the above method, a polybutadiene composition containing 1,4-polybutadiene and 1,2-polybutadiene can be produced. The polybutadiene composition is preferably produced through a method including step Y and further including step X of preparing 1,2-polybutadiene. In accordance with needs, the production method may further include step Z of modifying 1,4-polybutadiene. Step X, step Y, and step Z will next be described in detail in this order.

<Step X (1,2-Polymerization Step)>

In step X, 1,2-polybutadiene is produced through polymerization of 1,3-butadiene in the presence of a cobalt-containing catalyst. Step X includes a step of preparing a mixture of 1,3-butadiene and an organic solvent; a step of polymerizing (more specifically, 1,2-polymerization of) 1,3-butadiene in the presence of a cobalt-containing catalyst; and a step of terminating the polymerization reaction. Hereinafter, 1,2-polybutadiene produced through the polymerization reaction in step X may also be referred to as "1,2-polybutadiene (A)." As used herein, the term "1,2-polymerization" refers to polymerization wherein the amount of monomer units prepared by 1,2-bonding of 1,3-butadiene is more than 50 mass % in polybutadiene produced through polymerization of 1,3-butadiene. The term "1,2-polybutadiene" refers to polybutadiene wherein the amount of monomer units prepared by 1,2-bonding of 1,3-butadiene is more than 50 mass %.

(Preparation Step)

The organic solvent used in this step is a solvent containing a hydrocarbon or a halogenated hydrocarbon as a main component. Specific examples of the hydrocarbon include C4 to C10 saturated aliphatic hydrocarbons, such as butane, pentane, hexane, and heptane; C6 to C20 saturated alicyclic hydrocarbons, such as cyclopentane and cyclohexane; monoolefins, such as 1-butene and 2-butene; and aromatic hydrocarbons, such as benzene, toluene, and xylene. Specific examples of the halogenated hydrocarbon include methylene chloride, chloroform, carbon tetrachloride, trichloroethylene, perchloroethylene, 1,2-dichloroethane, chlorobenzene, bromobenzene, and chlorotoluene. Among these organic solvents, a hydrocarbon is preferably used. The phrase "containing a hydrocarbon or a halogenated hydrocarbon as a main component" refers to the case where the amount of a hydrocarbon or a halogenated hydrocarbon is more than 50 mass %, preferably 70 mass % or more, more preferably 80 mass % or more, still more preferably 90 mass % or more, particularly preferably 95 mass % or more, based on the entire amount of the organic solvent used in this step.

In the mixture of 1,3-butadiene and the organic solvent, the amount of 1,3-butadiene is preferably 3 mass % or more, more preferably 5 mass % or more, based on the total amount of 1,3-butadiene and the organic solvent. The amount of 1,3-butadiene is preferably 80 mass % or less, more preferably 50 mass % or less, still more preferably 15 mass % or less, based on the total amount of 1,3-butadiene and the organic solvent. The mixture of 1,3-butadiene and the organic solvent is prepared preferably at 10 to 50° C., more preferably 30 to 40° C.

(Polymerization Step)

In this step, the mixture of 1,3-butadiene and the organic solvent prepared in the aforementioned preparation step is used for 1,2-polymerization of 1,3-butadiene in the organic solvent (which contains a hydrocarbon or a halogenated hydrocarbon as a main component) in the presence of a cobalt-containing catalyst. This step can produce 1,2-syndiotactic polybutadiene.

The cobalt-containing catalyst used in this step contains a cobalt compound. The cobalt compound is preferably a cobalt salt. Specific examples of the cobalt salt include cobalt halides, such as cobalt chloride, cobalt bromide, and cobalt iodide; and organic acid cobalt salts, such as cobalt octoate, cobalt Versatate, and cobalt naphthenate. Among these cobalt compounds, an organic acid cobalt salt is preferably used, since it contains no halogen atom.

The cobalt compound is preferably used in such an amount that the ratio by mole of 1,3-butadiene to cobalt atoms contained in the cobalt compound (i.e., 1,3-butadiene/Co) is 15,000 or more. The ratio of 1,3-butadiene/Co (by mole) is preferably 5,000 or more, since such a ratio can prevent an excessive decrease in the molecular weight of 1,2-polybutadiene (A). The cobalt compound is preferably used in such an amount that the ratio of 1,3-butadiene/Co (by mole) is 150,000 or less. The ratio of 1,3-butadiene/Co (by mole) is preferably 150,000 or less, since such a ratio can prevent a reduction in polymerization activity. The ratio of 1,3-butadiene/Co (by mole) is more preferably 10,000 or more. The ratio of 1,3-butadiene/Co (by mole) is more preferably 100,000 or less.

Preferably, the cobalt-containing catalyst used in step X further contains a phosphine compound and an organoaluminum compound together with the cobalt compound. The phosphine compound preferably has one branched aliphatic hydrocarbon group having three or more carbon atoms or one alicyclic hydrocarbon group having five or more carbon atoms, and two aromatic hydrocarbon groups. The branched aliphatic hydrocarbon group having three or more carbon atoms is preferably a C3 to C10 branched alkyl group. The alicyclic hydrocarbon group having five or more carbon atoms is preferably a C5 to C10 substituted or unsubstituted cycloalkyl group. The aromatic hydrocarbon group is preferably a phenyl group.

Specific examples of preferred phosphine compounds include diphenylcyclohexylphosphine, diphenylisopropylphosphine, diphenylisobutylphosphine, diphenyl-t-butylphosphine, diphenylcyclopentylphosphine, diphenyl (4-methylcyclohexyl)phosphine, diphenylcycloheptylphosphine, and diphenylcyclooctylphosphine. These phosphine compounds may be used singly or in combination of two or more species. The amount of the phosphine compound incorporated is preferably 1 to 5 mol, more preferably 1.5 to 4 mol, based on 1 mol of the cobalt compound.

Examples of the organoaluminum compound include an aluminoxane (e.g., methylaluminoxane) and a compound prepared through contact between trialkylaluminum and water (hereinafter the compound may be referred to as "aluminum hydride compound"). The aluminoxane may be a previously synthesized product or may be synthesized in a polymerization system. When the aluminum hydride compound is prepared through contact between trialkylaluminum and water, any form of water (e.g., vapor, liquid, or solid (ice)) may be brought into contact with a solution of trialkylaluminum in an inert organic solvent. Alternatively, water may be brought into contact with trialkylaluminum in the form of solution, dispersion, or emulsion in an inert organic solvent or in the form of gas or mist in an inert gas.

In the cobalt-containing catalyst, the organoaluminum compound is preferably used in such an amount that the ratio by mole of 1,3-butadiene to aluminum atoms contained in the organoaluminum compound (i.e., 1,3-butadiene/Al) is 500 or more. When the ratio of 1,3-butadiene/Al (by mole) is 500 or more, reaction tends to proceed sufficiently. The organoaluminum compound is preferably used in such an amount that the ratio of 1,3-butadiene/Al (by mole) is 4,000 or less. The ratio of 1,3-butadiene/Al (by mole) is preferably 4,000 or less, since such a ratio can possibly achieve high polymerization activity. The ratio of 1,3-butadiene/Al is more preferably 800 or less. The ratio of 1,3-butadiene/Al is more preferably 2,000 or less.

The reaction temperature for 1,2-polymerization is generally −20° C. to 80° C., preferably 10° C. to 60° C. The reaction time is preferably 5 minutes to 6 hours, more preferably 10 to 3 hours. The polymerization reaction may be performed in a batch or continuous system. The 1,3-butadiene concentration of the reaction mixture is generally 5 to 80 mass %, preferably 8 to 25 mass %. In order to avoid inactivation of the catalyst or the polymer, measures may be taken to prevent contamination of the polymerization system with oxygen, water, or a compound having an inactivation effect (e.g., carbon dioxide).

(Termination Step)

In step X, the syndiotactic-1,2-polymerization reaction is preferably terminated by adding an organoaluminum compound to the polymerization system after achievement of a desired conversion of the 1,2-polymerization reaction.

Examples of the organoaluminum compound used for termination of the 1,2-polymerization reaction include alkylaluminum compounds, such as trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, and trioctylaluminum; and aluminum hydride compounds, such as diethylaluminum hydride, di-n-propylaluminum hydride, di-n-butylaluminum hydride, diisobutylaluminum hydride, dihexylaluminum hydride, diisohexylaluminum hydride, dioctylaluminum hydride, and diisooctylaluminum hydride. Of these, the organoaluminum compound used for termination of the 1,2-polymerization reaction is preferably at least one species selected from the group consisting of diisobutylaluminum hydride, triethylaluminum, triisobutylaluminum, and diethylaluminum hydride. These organoaluminum compounds may be used singly or in combination of two or more species.

The amount of the organoaluminum compound used for termination of the 1,2-polymerization reaction is preferably 1 mol or more, more preferably 5 mol or more, based on 1 mol of the cobalt compound used for the 1,2-polymerization reaction. The amount of the organoaluminum compound used is preferably 20 mol or less, more preferably 15 mol or less, based on 1 mol of the cobalt compound used for the 1,2-polymerization reaction. The amount of the organoaluminum compound used preferably falls within the aforementioned range, since an excessive increase in the molecular weight of 1,2-polybutadiene (A) is prevented, or an excessive decrease in the molecular weight of 1,4-polybutadiene (i.e., matrix component) is prevented. The temperature for the polymerization termination reaction is generally −20° C. to 80° C., preferably 10° C. to 60° C. The conversion of the 1,2-polymerization reaction is preferably 50% or more, more preferably 55% or more, still more preferably 60% or more.

Step X can produce 1,2-syndiotactic polybutadiene as 1,2-polybutadiene (A). The produced 1,2-polybutadiene (A) has a melting point of preferably 60° C. or higher, more preferably 100° C. or higher, still more preferably 130° C. or higher. 1,2-Polybutadiene (A) has a melting point of preferably 150° C. or lower, more preferably 145° C. or lower, still more preferably 140° C. or lower. The melting point of 1,2-polybutadiene (A) is preferably 60° C. or higher, since low fuel cost (low rolling resistance) and wet skid resistance can be sufficiently secured. Meanwhile, the melting point of 1,2-polybutadiene (A) is preferably 150° C. or lower, since the processability of a rubber composition can be sufficiently secured.

1,2-Polybutadiene (A) preferably has a weight average molecular weight (Mw) of 50,000 or more, more preferably 70,000 or more, particularly preferably 100,000 or more as determined through gel permeation chromatography (GPC) in terms of polystyrene. The weight average molecular weight (Mw) of 1,2-polybutadiene (A) is preferably 500,000 or less, more preferably 400,000 or less, particularly preferably 300,000 or less. When the weight average molecular weight of 1,2-polybutadiene (A) is less than 50,000, the resultant crosslinked product tends to exhibit impaired wear resistance, whereas when the weight average molecular weight is more than 400,000, the resultant rubber composition tends to exhibit poor processability.

1,2-Polybutadiene (A) has a 1,2-vinyl bond content of preferably 70% or more, more preferably 80% or more, still more preferably 90% or more, particularly preferably 95% or more. In particular, the 1,2-vinyl bond content is preferably 90% or more, since a crosslinked product produced from the polybutadiene composition achieves superior energy efficiency. The 1,2-vinyl bond content is determined by means of an infrared spectrophotometer.

<Step Y (Cis-1,4-Polymerization Step)>

In step Y, polymerization (cis-1,4-polymerization) of 1,3-butadiene is performed in the presence of 1,2-polybutadiene and a lanthanoid-containing catalyst for production of 1,4-polybutadiene, which is a matrix component of the polybutadiene composition. The 1,2-polybutadiene used in this step is preferably 1,2-polybutadiene (A) produced in step X. For simplification of the production process, 1,3-butadiene is preferably polymerized through addition of a lanthanoid-containing catalyst to the reaction mixture prepared in step X. In step Y, isoprene may be added during the cis-1,4-polymerization, to thereby polymerize isoprene in addition to polymerization of 1,3-butadiene. As used herein, the term "cis-1,4-polymerization" refers to polymerization wherein the amount of monomer units prepared by cis-1,4-bonding of 1,3-butadiene is more than 50 mass % in polybutadiene produced through polymerization of 1,3-butadiene. The term "1,4-polybutadiene" refers to polybutadiene wherein the amount of monomer units prepared by 1,4-bonding (including cis-1,4-bonding and trans-1,4-bonding) of 1,3-butadiene is more than 50 mass %.

The lanthanoid-containing catalyst used in step Y contains a lanthanoid compound. The lanthanoid compound is a compound having at least one element belonging to lanthanoid. The lanthanoid compound may be a reaction product between a lanthanoid-containing compound and a Lewis base. The lanthanoid contained in the lanthanoid compound is preferably at least one element selected from the group consisting of neodymium, praseodymium, cerium, lanthanum, gadolinium, and samarium, and is particularly preferably neodymium. Specific examples of the lanthanoid compound include carboxylates, alkoxides, β-diketone complexes, phosphates, and phosphites of lanthanoid.

Specific examples of lanthanoid carboxylates include compounds represented by the following formula (1): $(R^1—CO_2)_3M$ (wherein M represents lanthanoid, and $R^1$ represents a C1 to C20 monovalent hydrocarbon group). In formula (1), $R^1$ is preferably a saturated or unsaturated monovalent chain hydrocarbon group, and is preferably a linear or branched alkyl or cycloalkyl group. The carbonyl group in formula (1) is bonded to a primary, secondary, or tertiary carbon atom contained in the group $R^1$. M is preferably neodymium, praseodymium, cerium, lanthanum, gadolinium, or samarium, and is more preferably neodymium.

Specific examples of the compound represented by the formula (1) include salts of, for example, octanoic acid, 2-ethylhexanoic acid, oleic acid, stearic acid, benzoic acid, naphthenic acid, and trade name "Versatic acid" (manufactured by Shell Chemicals, a carboxylic acid having a carboxyl group bonded to a tertiary carbon atom). Of these, the compound represented by the formula (1) is preferably a salt of Versatic acid, 2-ethylhexanoic acid, or naphthenic acid.

Specific examples of lanthanoid alkoxides include compounds represented by the following formula (2): $(R^2O)_3M$ (wherein M represents lanthanoid, and $R^2$ represents a C1 to C20 monovalent hydrocarbon group). In formula (2), $R^2$ is, for example, a monovalent chain hydrocarbon group, alicyclic hydrocarbon group, or aromatic hydrocarbon group. $R^2$ is preferably a monovalent aromatic hydrocarbon group. Specific examples of the group "$R^2O—$" in formula (2) include a 2-ethyl-hexylalkoxy group, an oleylalkoxy group, a stearylalkoxy group, a phenoxy group, and a benzylalkoxy group. Of these, the group "$R^2O—$" is preferably a 2-ethylhexylalkoxy group or a benzylalkoxy group. The description and preferred examples of M are the same as described in relation to formula (1).

Specific examples of lanthanoid β-diketone complexes include an acetylacetone complex, a benzoylacetone complex, a propionitrileacetone complex, a valerylacetone complex, and an ethylacetylacetone complex. Of these, an acetylacetone complex or an ethylacetylacetone complex is preferred.

Specific examples of lanthanoid phosphates or phosphites include lanthanoid salts of bis(2-ethylhexyl) phosphate, bis(1-methylheptyl) phosphate, bis(p-nonylphenyl) phosphate, bis(polyethylene glycol-p-nonylphenyl) phosphate, (1-methylheptyl)(2-ethylhexyl) phosphate, (2-ethylhexyl)(p-nonylphenyl) phosphate, mono-2-ethylhexyl 2-ethylhexylphosphonate, mono-p-nonylphenyl 2-ethylhexylphosphonate, bis(2-ethylhexyl)phosphinate, bis(1-methylheptyl) phosphinate, bis(p-nonylphenyl)phosphinate, (1-methylheptyl)(2-ethylhexyl)phosphinate, and (2-ethylhexyl)(p-non-ylphenyl)phosphinate. Of these, the phosphate or the phosphite is preferably bis(2-ethylhexyl) phosphate, bis(1-methylheptyl) phosphate, mono-2-ethylhexyl 2-ethylhexylphosphonate, or bis(2-ethylhexyl)phosphinate.

The lanthanoid compound used in step Y is preferably a carboxylate or a phosphate, more preferably a carboxylate, among the aforementioned examples. Of these, the lanthanoid compound is still more preferably a phosphate or carboxylate of neodymium, particularly preferably a carboxylate of neodymium, such as neodymium Versatate or neodymium 2-ethylhexanoate.

In order to solubilize the lanthanoid compound in a solvent or store the compound in a stable state for a long period of time, preferably, the lanthanoid compound is mixed with a Lewis base, or the lanthanoid compound is reacted with a Lewis base to prepare a reaction product. The amount of the Lewis base used is preferably 0 to 30 mol, more preferably 1 to 10 mol, based on 1 mol of the lanthanoid contained in the lanthanoid compound. Specific examples of the Lewis base include acetylacetone, tetrahydrofuran, pyridine, N,N-dimethylformamide, thiophene, diphenyl ether, triethylamine, organophosphorus compounds, and monohydric or dihydric alcohols. In step Y, a single lanthanoid compound may be used, or two or more lanthanoid compounds may be used in combination.

The amount of the lanthanoid compound used in step Y is preferably 0.00001 to 1.0 mmol, more preferably 0.0001 to 0.5 mmol, based on 100 g of 1,3-butadiene used in step Y. The amount of the lanthanoid compound used is preferably 0.00001 mmol or more, since sufficiently high polymerization activity can be achieved. The amount of the lanthanoid compound used is preferably 1.0 mmol or less, since an excessive increase in catalyst concentration can be prevented, and a decalcification step can be omitted.

Preferably, the lanthanoid-containing catalyst used in step Y further contains an organoaluminum compound and a halogen compound together with the lanthanoid compound.

The organoaluminum compound used is preferably at least one member selected from the group consisting of aluminoxanes, alkylaluminum compounds, and aluminum hydride compounds. Particularly preferably, at least one compound selected from the group consisting of alkylaluminum compounds and aluminum hydride compounds (hereinafter the compound may be referred to as "aluminum compound (L)") is used in combination with an aluminoxane.

Specific examples of preferred aluminoxanes used in this step include compounds represented by the following formulae (3) and (4). There may be used aluminoxane aggregates described in Fine Chemical, 23, (9) 5 (1994), J. Am. Chem. Soc., 115, 4971 (1993), and J. Am. Chem. Soc., 117, 6465 (1995).

[F1]

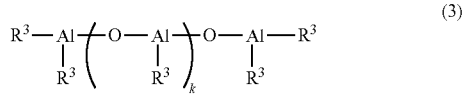
(3)

(4)

(In formulae (3) and (4), $R^3$ and $R^4$ each independently represent a C1 to C20 monovalent hydrocarbon group, and k and m each independently represent an integer of 2 or more. In formula (3), a plurality of groups $R^3$ may be identical to or different from one another. In formula (4), when m is 2 or more, a plurality of groups $R^4$ may be identical to or different from one another.)

Examples of the group $R^3$ in formula (3) and the group $R^4$ in formula (4) include a methyl group, an ethyl group, a propyl group, a butyl group, an isobutyl group, a t-butyl group, a hexyl group, an isohexyl group, an octyl group, and an isooctyl group. Of these, a methyl group, an ethyl group, an isobutyl group, or a t-butyl group is preferred, and a methyl group is particularly preferred. In formulae (3) and (4), k and m are each preferably an integer of 4 to 100.

Specific examples of the aluminoxane include methylaluminoxane (hereinafter may be referred to as "MAO"), ethylaluminoxane, n-propylaluminoxane, n-butylaluminoxane, isobutylaluminoxane, t-butylaluminoxane, hexylaluminoxane, and isohexylaluminoxane. Of these, MAO is preferred. These aluminoxanes may be used singly or in combination of two or more species.

The amount of the aluminoxane used in the lanthanoid-containing catalyst is adjusted such that the amount of aluminum (Al) contained in the aluminoxane is preferably 1 to 500 mol, more preferably 3 to 250 mol, still more preferably 5 to 200 mol, based on 1 mol of the lanthanoid compound used in the 1,4-polymerization reaction. The amount of the aluminoxane used is preferably adjusted as described above, since a reduction in catalyst activity is prevented, and a catalyst residue removing step can be omitted.

Specific examples of the aluminum compound (L) include alkylaluminum compounds and aluminum hydride compounds exemplified above in the description of the termination step. The aluminum compounds (L) may be used singly or in combination of two or more species. Among the aforementioned compounds, the aluminum compound (L) is preferably at least one species selected from the group consisting of diisobutylaluminum hydride, triethylaluminum, triisobutylaluminum, and diethylaluminum hydride. The total amount of the aluminum compound(s) (L) used for preparation of the lanthanoid-containing catalyst is preferably 1 to 700 mol, more preferably 3 to 500 mol, based on 1 mol of the lanthanoid compound used in the 1,4-polymerization reaction.

The halogen compound used as one component of the lanthanoid-containing catalyst is preferably a chlorine-containing compound, and is more preferably at least one species selected from the group consisting of silicon chloride compounds and hydrocarbon chloride compounds. Examples of the silicon chloride compound used include trimethylsilyl chloride, triethylsilyl chloride, and dimethylsilyl dichloride. Of these, trimethylsilyl chloride is preferably used as the silicon chloride compound. Specific examples of the hydrocarbon chloride compound include methyl chloride, butyl chloride, hexyl chloride, octyl chloride, chloroform, dichloromethane, and benzylidene chloride. Of these, methyl chloride, chloroform, or dichloromethane is preferably used.

For preparation of the lanthanoid-containing catalyst, the halogen compound is used in such an amount that the ratio by mole of halogen atoms contained in the halogen compound to the lanthanoid compound (i.e., halogen atom/lanthanoid compound) is preferably 0.5 to 3, more preferably 1.0 to 2.5, still more preferably 1.2 to 1.8. The ratio by mole of halogen atom/lanthanoid compound is preferably 0.5 or more, since the activity of a polymerization catalyst can be sufficiently increased. The ratio by mole of halogen atom/lanthanoid compound is preferably 3 or less, since the halogen compound can be prevented from being a catalyst poison.

The reaction temperature for the 1,4-polymerization in step Y is preferably −30° C. to 200° C., more preferably 0° C. to 150° C. No particular limitation is imposed on the type of the polymerization reaction. Thus, the polymerization reaction may be performed by means of a batch-type reactor, or continuously performed by means of, for example, a multistage continuous reactor. When the 1,4-polymerization reaction of 1,3-butadiene is performed by use of a polymerization solvent, the amount of the monomer contained in the solvent is preferably 5 to 50 mass %, more preferably 7 to 35 mass %. In order to produce 1,4-polybutadiene and to avoid inactivation of 1,4-polybutadiene having active ends, measures are preferably taken to prevent contamination of the polymerization system with oxygen, water, or a compound having an inactivation effect (e.g., carbon dioxide).

The aforementioned 1,4-polymerization reaction can produce 1,4-polybutadiene having active ends (hereinafter may be referred to as "1,4-polybutadiene (B)"). The resultant 1,4-polybutadiene (B) has a weight average molecular weight (Mw) of preferably 50,000 or more, more preferably 100,000 or more, particularly preferably 150,000 or more, as determined through GPC in terms of polystyrene. The weight average molecular weight (Mw) of 1,4-polybutadiene (B) is preferably 2,000,000 or less, more preferably 1,500,000 or less, particularly preferably 1,000,000 or less. When the weight average molecular weight of 1,4-polybutadiene (B) is less than 50,000, the resultant crosslinked product tends to exhibit impaired wear resistance, whereas when the weight average molecular weight is more than 2,000,000, the resultant rubber composition tends to exhibit poor processability.

The ratio of the weight average molecular weight (Mw) to the number average molecular weight (Mn) (i.e., Mw/Mn) of 1,4-polybutadiene (B) is preferably 1.1 or more, more preferably 2.0 or more, still more preferably 2.1 or more, from the viewpoint of ease of production of the polymer. 1,4-Polybutadiene (B) exhibits an Mw/Mn of preferably 4.0 or less, more preferably 3.5 or less. The Mw/Mn of 1,4-polybutadiene (B) is preferably 4.0 or less, since the resultant crosslinked product exhibits better fracture characteristics resistance and low pyrogenicity.

The cis-1,4-structure content of 1,4-polybutadiene (B) is preferably 70% or more, more preferably 80% or more, still more preferably 89% or more, particularly preferably 93% or more. In particular, the cis-1,4-structure content is preferably 89% or more, since a crosslinked product produced from the polybutadiene composition exhibits better crack growth resistance and wear resistance. Step Y produces the polybutadiene composition; i.e., a mixture of 1,4-polybutadiene (B) (matrix component) and 1,2-syndiotactic polybutadiene.

The polybutadiene composition produced through step Y contains 1,2-polybutadiene (A) in an amount of preferably 5 mass % or more, more preferably 7 mass % or more, still more preferably 10 mass % or more, based on the entire amount of the polybutadiene composition. The amount of 1,2-polybutadiene (A) is preferably 30 mass % or less, more preferably 23 mass % or less, still more preferably 15 mass % or less, based on the entire amount of the polybutadiene composition. The amount of 1,2-polybutadiene (A) contained in the polybutadiene composition is preferably 5 mass % or more, since the rubber composition exhibits sufficiently high processability. Meanwhile, the amount of 1,2-polybutadiene (A) contained in the polybutadiene composition is preferably 30 mass % or less, since a crosslinked product produced from the rubber composition exhibits sufficiently high wear resistance.

<Step Z (Modification Step)>

Immediately after achievement of a desired conversion of the cis-1,4-polymerization reaction through step Y, an antioxidant (e.g., 2,4-di-tert-butyl-p-cresol or 4,6-bis(octylthiomethyl)-o-cresol) may be added to the polymerization system through a common technique. Alternatively, the polymerization ends of 1,4-polybutadiene (B) may be modified with an alkoxysilane compound before addition of an antioxidant. Through such modification, the active ends of 1,4-polybutadiene (B) can be reacted with an alkoxysilane compound, to thereby yield 1,4-polybutadiene having silicon-containing-group-introduced polymerization ends. Thus, this step can produce a polybutadiene composition containing 1,4-polybutadiene having modified ends.

The alkoxysilane compound used in the modification step (hereinafter may be referred to as "alkoxysilane compound (S)") is preferably a compound having at least one alkoxysilyl group and capable of reacting with active ends of 1,4-polybutadiene (B). Such an alkoxysilane compound (S) is preferably an alkoxysilane compound having at least one functional group selected from the group consisting of an epoxy group, an isocyanato group, a carbonyl group, and a cyano group in view of high reactivity with the active ends. The alkoxysilane compound (S) may be a partially condensed product, or a mixture of an alkoxysilane compound and a partially condensed product.

Specific examples of the alkoxysilane compound (S) include epoxy-group-containing alkoxysilane compounds, such as 2-glycidoxyethyltrimethoxysilane, 2-glycidoxyethyltriethoxysilane, (2-glycidoxyethyl) methyldimethoxysilane, 3-glycidoxypropyltrimethoxysilane, 3-glycidoxypropyltriethoxysilane, (3-glycidoxypropyl)methyldimethoxysilane, 2-(3,4-epoxycyclohexyl)ethyltrimethoxysilane, 2-(3,4-epoxycyclohexyl)ethyltriethoxysilane, and 2-(3,4-epoxycyclohexyl)ethyl(methyl)dimethoxysilane; isocyanato-group-containing alkoxysilane compounds, such as 3-isocyanatopropyltrimethoxysilane, 3-isocyanatopropyltriethoxysilane, 3-isocyanatopropylmethyldiethoxysilane, and 3-isocyanatopropyltriisopropoxysilane; carbonyl-group-containing alkoxysilane compounds, such as 3-(meth)acryloyloxypropyltriethoxysilane, 3-(meth)acryloyloxypropyltrimethoxysilane, 3-(meth) acryloyloxypropylmethyldiethoxysilane, and 3-(meth)acryloyloxypropyltriisopropoxysilane; and cyano-group-containing alkoxysilane compounds, such as 3-cyanopropyltriethoxysilane, 3-cyanopropyltrimethoxysilane, 3-cyanopropylmethyldiethoxysilane, and 3-cyanopropyltriisopropoxysilane. These alkoxysilane compounds (S) may be used singly or in combination of two or more species. The term "(meth)acrylo" as used herein is intended to include "acrylo" and "methacrylo."

The amount of the alkoxysilane compound (S) used for the aforementioned modification reaction is preferably 0.01 mol or more, more preferably 0.1 mol or more, based on 1 mol of the lanthanoid compound used in step Y. When the amount of the alkoxysilane compound (S) is less than 0.01 mol, the modification reaction may proceed insufficiently, and the filler dispersibility may be unsatisfactorily improved. The amount of the alkoxysilane compound (S) used is preferably 200 mol or less, more preferably 150 mol or less, based on 1 mol of the lanthanoid compound used in step Y. Even when the alkoxysilane compound (S) is used in an amount of more than 200 mol, the modification reaction is saturated, and thus excessive use of the compound leads to an increase in production cost. No particular limitation is imposed on the method for adding the alkoxysilane compound (S). For example, the compound may be added at one time, in a divided manner, or in a continuous manner.

The aforementioned modification reaction is preferably performed in a solution. The solution may be an unreacted-monomer-containing solution prepared above in step Y. The use of this solution is preferred, since a production process can be simplified. No particular limitation is imposed on the type of the modification reaction. Thus, the modification reaction may be performed by means of a batch-type reactor, or continuously performed by means of, for example, a multistage continuous reactor or an inline mixer. The aforementioned modification reaction is optionally performed after completion of the polymerization reaction. Preferably, the modification reaction is performed before, for example, operations required for solvent removal treatment, water treatment, thermal treatment, and polymer isolation.

The temperature for the aforementioned modification reaction is preferably equal to the polymerization temperature of 1,4-polybutadiene. Specifically, the temperature is preferably 20 to 100° C., more preferably 40 to 90° C. When the temperature is excessively low, the viscosity of the polymer tends to increase, whereas when the temperature is excessively high, the polymerization active ends are easily inactivated, which is not preferred. The modification reaction time is preferably 5 minutes to 5 hours, more preferably 15 minutes to 1 hour. In the production method of the present disclosure, a known antioxidant or reaction terminating agent may optionally be added in a solvent removal step after completion of 1,4-polymerization in step Y (in the case where the modification reaction is not performed) or after completion of the modification reaction.

When the ends of 1,4-polybutadiene (B) are modified in step Z, a compound that reacts with and consumed by the residue of the alkoxysilane compound (S) introduced to the active ends (hereinafter the compound may be referred to as "condensation catalyst") may further be added in a solvent removal step after the modification reaction. Specific examples of the condensation catalyst include those containing at least one element belonging to groups 4A, 2B, 3B, 4B, and 5B of the periodic table. Such a condensation catalyst is preferably added. Addition of the condensation catalyst can effectively promote the condensation reaction of the residue of the alkoxysilane compound (S), thereby producing 1,4-polybutadiene achieving excellent processability, low-temperature properties, and wear resistance.

The condensation catalyst preferably contains at least one element selected from the group consisting of titanium, tin, zirconium, bismuth, and aluminum. Specific examples of the condensation catalyst include titanium-containing condensation catalysts, such as tetramethoxytitanium, tetraethoxytitanium, tetra-i-propoxytitanium, tetra-tert-butoxytitanium, titanium tributoxystearate, and titanium tripropoxyethylacetoacetate; tin-containing condensation catalysts, such as tin bis(n-octanoate), tin bis(2-ethylhexanoate), and tin bis(laurate); zirconium-containing condensation catalysts, such as tetraethoxyzirconium, tetra-n-propoxyzirconium, and tetra-tert-butoxyzirconium; bismuth-containing condensation catalysts, such as bismuth tris(2-ethylhexanoate) and bismuth tris(laurate); and aluminum-containing condensation catalysts, such as triethoxyaluminum, tri-n-propoxyaluminum, tri-i-propoxyaluminum, and aluminum dibutoxyethylacetoacetate.

The polybutadiene composition of the present disclosure can be produced by removing the solvent from the above-prepared solution, and isolating the resultant polybutadiene. The polybutadiene can be isolated through a known solvent removal method (e.g., steam stripping) or a drying operation such as thermal treatment.

The polybutadiene composition produced through the aforementioned production method preferably contains 1,4-polybutadiene (i.e., a matrix component) and 1,2-syndiotactic polybutadiene having a melting point of 60 to 150° C. in an amount of 5 to 30 mass % based on the total amount of 1,4-polybutadiene and 1,2-polybutadiene. This polybutadiene composition can be suitably used as a material for producing vulcanized rubber exhibiting superior crack growth resistance. Modification of the ends of 1,4-polybutadiene contained in the polybutadiene composition through step Z described above can produce a polybutadiene composition containing 1,4-polybutadiene having the ends provided with the residue of the alkoxysilane compound (S) and 1,2-syndiotactic polybutadiene. This polybutadiene composition is suitable as a material for producing vulcanized rubber exhibiting superior crack growth resistance and achieving excellent energy efficiency.

The cis-1,4-bond content of the polybutadiene composition is preferably 55% or more, more preferably 65% or more, still more preferably 75% or more. The cis-1,4-bond content is preferably 55% or more, since the resultant crosslinked product exhibits better crack growth resistance and wear resistance. The cis-1,4-bond content of the polybutadiene composition is preferably 95% or less, more preferably 92% or less, still more preferably 90% or less.

The 1,2-bond content of the polybutadiene composition is preferably 40% or less, more preferably 30% or less, still more preferably 25% or less. The 1,2-bond content of the polybutadiene composition is preferably 5% or more, more preferably 8% or more.

The polybutadiene composition has a Mooney viscosity (ML 1+4, 100° C.) of preferably 10 or more, more preferably 20 or more. The polybutadiene composition has a Mooney viscosity (ML 1+4, 100° C.) of preferably 150 or less, more preferably 100 or less. When the Mooney viscosity (ML 1+4, 100° C.) is 10 or more, rubber properties (including fracture characteristics) can be sufficiently secured. The Mooney viscosity (ML 1+4, 100° C.) is preferably 150 or less, since good workability can be achieved, and the composition can be homogeneously kneaded with compounding agents. The "Mooney viscosity (ML 1+4, 100° C.)" as used herein is measured according to JIS K6300-1: 2013.

The ratio of the weight average molecular weight (Mw) to the number average molecular weight (Mn) (i.e., Mw/Mn) of the resultant polybutadiene composition is preferably 1.1 or more, more preferably 2.0 or more, still more preferably 2.1 or more, from the viewpoint of ease of production of the composition. The Mw/Mn of the polybutadiene composition is preferably 4.0 or less, more preferably 3.5 or less. The Mw/Mn of the polybutadiene composition is preferably 4.0 or less, since the resultant crosslinked product exhibits better fracture chcracteristics.

<Rubber Composition>

The rubber composition contains the polybutadiene composition produced through the aforementioned production method and may contain an additional component in accordance with needs. The additional component will next be described.

The rubber composition of the present invention may contain an inorganic filler. Examples of the inorganic filler include silica and carbon black. The silica includes wet silica (hydrated silica), dry silica (silicic anhydride), colloidal silica, precipitated silica, calcium silicate, and aluminum silicate, and is preferably wet silica.

Examples of the carbon black include, but are not particularly limited to, GPF, FEF, HAF, ISAF, and SAF. The rubber composition may contain any reinforcing inorganic filler (e.g., clay or calcium carbonate) besides silica or carbon black. In the case where such an additional inorganic filler is used, the amount of the inorganic filler (the total amount of the modified silica and the additional inorganic filler) contained in the rubber composition is preferably 25 to 130 parts by mass, more preferably 30 to 110 parts by mass, relative to 100 parts by mass of the total amount of the polymer components contained in the rubber composition.

The rubber composition generally contains a crosslinking agent. Examples of the crosslinking agent include sulfur, sulfur halides, organic peroxides, quinone dioximes, organic polyamine compounds, and alkyl phenolic resins having a methylol group. Sulfur is generally used. The amount of sulfur is preferably 0.1 to 5 parts by mass, more preferably 0.5 to 3 parts by mass, relative to 100 parts by mass of the total amount of the rubber components contained in the rubber composition.

The rubber composition may contain an additional rubber component different from the polybutadiene. Examples of the type of the additional rubber component include, but are not particularly limited to, styrene butadiene rubber (SBR), natural rubber (NR), isoprene rubber (IR), styrene-isoprene copolymer rubber, and butadiene-isoprene copolymer rubber. The amount of the additional rubber component is preferably 5 parts by mass or more, more preferably 10 parts by mass or more, relative to 100 parts by mass of the total amount of the polymer components contained in the rubber composition, in order to further improve the fuel efficiency by containing the additional rubber component. The amount of the additional rubber component is preferably 60 parts by mass or less, more preferably 50 parts by mass or less, relative to 100 parts by mass of the total amount of the polymer components contained in the rubber composition, in order to further improve crack growth resistance of a crosslinked product by containing the polybutadiene component.

The rubber composition may contain, in addition to the aforementioned components, any additive that is commonly used in a rubber composition. Examples of the additive include an antioxidant, zinc oxide, stearic acid, a softener, a vulcanization accelerator, a silane coupling agent, a compatibilizer, a vulcanization aid, a process oil, a processing aid, and an anti-scorching agent. The amount of such an additive incorporated into the rubber composition may be appropriately determined, so long as the advantageous effects of the present disclosure are not impaired.

<Crosslinked Product>

The rubber composition of the present disclosure can be prepared through mixing of the polymer components, the inorganic filler, and an optional component by means of, for example, an open-type kneader (e.g., a roll) or a closed-type kneader (e.g., a Banbury mixer). The polymer composition is prepared into a crosslinked product through molding and subsequent crosslinking (vulcanization). The resultant crosslinked polymer can be applied to various rubber products. For example, the crosslinked polymer can be applied to tires (e.g., tire tread, undertread, carcass, sidewall, and bead); sealing materials, such as packing, gasket, weather strip, and O-ring; interior and exterior surface materials for various vehicles, such as automobile, ship, aircraft, and train; building materials; vibration-proof rubbers for industrial machines and facilities; hoses and hose covers, such as diaphragm, roll, radiator hose, and air hose; belts, such as belts for power transmission; linings; dust boots; materials for medical devices; fenders; insulating materials for electric wires; and other industrial products.

The polybutadiene composition can produce a crosslinked product exhibiting excellent crack growth resistance, and superior fuel efficiency and rigidity. Thus, the polybutadiene composition is particularly suitable for use as a material of a tire tread and sidewall. The tire can be produced by a customary method. For example, the rubber composition containing a rubber component and an optional component is mixed by means of a kneader to form a sheet, and the sheet is disposed at a predetermined position and vulcanized by a customary method, to thereby form a tread rubber or a sidewall rubber. A pneumatic tire is thereby produced.

The following will specifically describe the present invention based on examples, but the contents of the present invention are not limited to these examples. Unless otherwise specified, the units "part(s)" and "%" described in Examples and Comparative Examples refer to "part(s) by mass" and "mass %," respectively. Physical properties of a polymer were determined as described below.

[Mooney viscosity]: Measured according to JIS K6300-1: 2013 by use of an L-rotor under the following conditions: preheating: 1 minute, rotor operation time: 4 minutes, and temperature: 100° C.

[Molecular weight distribution]: Measured by means of a gel permeation chromatograph (trade name: VISCOTEK GPC-max, manufactured by Malvern) and a differential refractometer (serving as a detector) under the following conditions, and calculated as reduced to standard polystyrene.

Column: trade name "GMHHR-H" (manufactured by TOSOH CORPORATION), two columns, column temperature: 38° C.

Mobile phase: tetrahydrofuran, flow rate: 1.0 mL/minute

Sample concentration: 10 mg/20 mL

[Cis-1,4-bond content and 1,2-vinyl-bond content]: Measured by means of an infrared spectrophotometer (trade name: FT/IR-4100 series, manufactured by Jasco Corporation) with ZnSe prism at a wave number of 1,000 to 600 $cm^{-1}$.

[1,2-Polybutadiene content]: The 1,2-syndiotactic polybutadiene content a was calculated by use of the calculation formulae (1) to (4) described below.

Abbreviations in the calculation formulae (1) to (4) have the following meanings.

Q1: Amount of added 1,3-butadiene (for syndiotactic-1,2-polymerization)

Q2: Amount of produced 1,2-polybutadiene

Q3: Amount of 1,3-butadiene unreacted in 1,2-polymerization

Q4: Amount of added 1,3-butadiene (for cis-1,4-polymerization)

Q5: Amount of produced 1,4-polybutadiene $$Q2=Q1\times(\text{conversion of syndiotactic-1,2-polymerization reaction}) \quad (1)$$

$$Q3=Q1-Q2 \quad (2)$$

$$Q5=(Q3+Q4)\times(\text{conversion of }cis\text{-1,4-polymerization reaction}) \quad (3)$$

$$\text{Content }\alpha=(Q2+(Q2+Q5))\times100 \quad (4)$$

1. Production and Evaluation of Polybutadiene Rubber

Example 1

Cyclohexane (1.5 kg) and 1,3-butadiene (50 g) were added to a 3 L autoclave purged with nitrogen. Separately, a dichloride solution containing cobalt chloride (0.02 mmol) was mixed with a dichloride solution containing diphenylcyclohexylphosphine (0.04 mmol) and a toluene solution containing methylaluminoxane (MAO) (0.6 mmol), and reaction was allowed to proceed at 30° C. for 60 minutes, to thereby prepare a catalyst composition A. The catalyst composition A was added to the aforementioned autoclave, and reaction (syndiotactic-1,2-polymerization) was allowed to proceed at 30° C. for one hour, to thereby prepare a polymer solution. The reaction conversion of added 1,3-butadiene was found to be about 75%. Thereafter, in order to terminate the polymerization reaction, a toluene solution containing diisobutylaluminum hydride (0.2 mmol) was added to the aforementioned autoclave, and the resultant mixture was stirred for 15 minutes.

Subsequently, 1,3-butadiene (250 g) was added to the resultant polymer solution. Separately, a cyclohexane solution containing neodymium Versatate (Nd(ver)$_3$) (0.037 mmol), a toluene solution containing MAO (1.2 mmol), a toluene solution containing diisobutylaluminum hydride (2.86 mmol), and a toluene solution containing trimethylsilyl chloride (Me$_3$SiCl) (0.045 mmol) were reacted with 1,3-butadiene (4.5 mmol) at 30° C. for 60 minutes, to thereby prepare a catalyst composition B. The catalyst composition B was added to the aforementioned autoclave, and reaction (cis-1,4-polymerization) was allowed to proceed at 70° C. for one hour, to thereby prepare a polymer solution. The reaction conversion of added 1,3-butadiene was found to be about 100%.

Subsequently, in order to measure the physical properties of the polybutadiene rubber produced through the aforementioned reaction, a portion (200 g) was taken out from the aforementioned polymer solution, and a toluene solution containing 2,4-di-tert-butyl-p-cresol (1.5 g) was added to the portion of the polymer solution, to thereby terminate the polymerization reaction. Thereafter, the solvent was removed through steam stripping, followed by drying by means of a roller at 110° C. The thus-dried product was polybutadiene rubber P. The physical properties of polybutadiene rubber P were measured, and the results were as follows: 1,2-polybutadiene content: 11%, melting point of 1,2-polybutadiene: 137° C., weight average molecular weight (Mw) of 1,2-polybutadiene: 140,000, Mooney viscosity (ML 1+4, 100° C.): 57, molecular weight distribution (Mw/Mn): 3.14, cis-1,4-bond content: 87.6%, and 1,2-vinyl-bond content: 11.1%.

Example 2 and Comparative Example 1

The same operation as in Example 1 was performed, except that the formulation for 1,2-polymerization was varied as shown in Table 1 below, and the formulation for cis-1,4-polymerization was modified as shown in Table 2 below, to thereby produce polybutadiene rubbers Q and R. Table 3 shows the results of measurement of the physical properties of the resultant polybutadiene rubbers Q and R. In Table 3, Comparative Example 2 corresponds to the results of measurement of commercially available polybutadiene rubber (trade name "BR01," manufactured by JSR Corporation)

TABLE 1

| | Cyclohexane [kg] | 1,3-butadiene [kg] | Catalyst composition A | | | | | | Reaction terminating agent | |
|---|---|---|---|---|---|---|---|---|---|---|
| | | | Cobalt compound | | Phosphine compound | | Aluminoxane | | | |
| | | | Type | Amount [mmol] | Type | Amount [mmol] | Type | Amount [mmol] | Type | Amount [mmol] |
| Example 1 | 1.5 | 0.05 | CoCL2 | 0.02 | PCH | 0.04 | MAO | 0.60 | AlBuH | 0.2 |
| Example 2 | 1.5 | 0.05 | CoCL2 | 0.02 | PCH | 0.04 | MAO | 0.64 | AlBuH | 0.2 |
| Comparative Example 1 | 1.5 | — | — | — | — | — | — | — | — | — |
| Comparative Example 2 | — | — | — | — | — | — | — | — | — | — |

TABLE 2

| | Addition of 1,3-butadiene [kg] | Catalyst composition B | | | | | | | | 1,3-butadiene Amount [mmol] |
|---|---|---|---|---|---|---|---|---|---|---|
| | | Lanthanoid compound | | Aluminoxane | | Aluminum compound (L) | | Halogen compound | | |
| | | Type | Amount [mmol] | Type | Amount [mmol] | Type | Amount [mmol] | Type | Amount [mmol] | |
| Example 1 | 0.25 | NdVer | 0.037 | MAO | 1.20 | AlBuH | 2.86 | MeSiCl | 0.045 | 4.5 |
| Example 2 | 0.25 | NdVer | 0.037 | MAO | 1.20 | AlBuH | 2.86 | MeSiCl | 0.045 | 4.5 |
| Comparative Example 1 | 0.3 | NdVer | 0.043 | MAO | 1.37 | — | 3.09 | MeSiCl | 0.051 | 5.1 |
| Comparative Example 2 | — | — | — | — | — | — | — | — | — | — |

Abbreviations shown in Tables 1 and 2 have the following meanings.
CoCL2: cobalt chloride
PCH: diphenylcyclohexylphosphine
AlBuH: diisobutylaluminum hydride
NdVer: neodymium Versatate
MeSiCl: trimethylsilyl chloride

TABLE 3

|  | Name | 1,2-polybutadiene content [%] | Melting point of 1,2-polybutadiene [° C.] | Mw of 1,2-polybutadiene | Mooney viscosity ML1 + 4, 100° C. | Mw/Mn | cis-1,4-bond [%] | 1,2-vinyl-bond [%] |
|---|---|---|---|---|---|---|---|---|
| Example 1 | P | 11 | 137 | 140000 | 57 | 3.14 | 87.6 | 11.1 |
| Example 2 | Q | 17 | 137 | 140000 | 58 | 3.43 | 83.2 | 16.7 |
| Comparative Example 1 | R | — | — | — | 50 | 2.31 | 99.1 | 0.2 |
| Comparative Example 2 | BR01 | — | — | — | 40 | — | 97.7 | 1.6 |

Example 3

In order to produce polybutadiene rubber containing modified 1,4-polybutadiene (hereinafter referred to as "modified polybutadiene rubber"), the remaining portion of the polymer solution of Example 1 was subjected to the following treatment. Specifically, a toluene solution containing 3-glycidyloxypropyl(dimethoxy)methylsilane (hereinafter referred to as "GOPDMS") (1.62 mmol) was added to the polymer solution maintained at 70° C., and reaction was allowed to proceed for 30 minutes, to thereby prepare a reaction solution. Thereafter, a toluene solution containing 2,4-di-tert-butyl-p-cresol (1.5 g) was added to the reaction solution, to thereby prepare a modified polymer solution (yield: 1.6 kg). Subsequently, an aqueous solution (5 L) having a pH of 10 (adjusted with sodium hydroxide) was added to the modified polymer solution, and condensation reaction and solvent removal were performed at 110° C. for one hour, followed by drying by means of a roller at 110° C. The thus-dried product was modified polybutadiene rubber S. Table 4 shows the results of measurement of the Mooney viscosity of the modified polybutadiene rubber S.

Example 4 and Comparative Example 3

The same operation as performed in Example 3 was repeated, except that the polymer solution of Example 1 was replaced with the polymer solutions of Example 2 and Comparative Example 1, and the amount of GOPDMS used was varied as shown in Table 4 below, to thereby produce modified polybutadiene rubbers T and U. Table 4 shows the results of measurement of the Mooney viscosities of the resultant modified polybutadiene rubbers T and U. In Table 4, Comparative Example 4 corresponds to commercially available polybutadiene rubber (trade name "BR01," manufactured by JSR Corporation)

TABLE 4

|  |  | Modifying agent Alkoxysilane compound | | Mooney viscosity |
|---|---|---|---|---|
|  | Name | Type | Amount [mmol] | ML1 + 4, 100° C. |
| Example 3 | S | GOPDMS | 1.62 | 63 |
| Example 4 | T | GOPDMS | 1.62 | 66 |
| Comparative Example 3 | U | GOPDMS | 1.85 | 65 |
| Comparative Example 4 | BR01 | — | — | 45 |

2. Preparation and Evaluation of Carbon-Black-Containing Rubber Composition

Example 5

A rubber component (100 parts) containing the modified polybutadiene rubber S of Example 3 (60%) and natural rubber (40%) was mixed with carbon black (trade name "DIABLACK N339," manufactured by Mitsubishi Chemical Corporation) (60 parts), T-DAE process oil (10 parts), stearic acid (2 parts), N-phenyl-N'-(1,3-dimethylbutyl)-p-phenylenediamine serving as an antioxidant (trade name "Nocrac 6C," manufactured by Ouchi Shinko Chemical Industrial Co., Ltd.) (1 part), zinc oxide (3 parts), CZ serving as a vulcanization promoter (trade name "Nocceler CZ-G," manufactured by Ouchi Shinko Chemical Industrial Co., Ltd.) (1 part), and sulfur (1.2 parts), and the resultant mixture was kneaded by means of a plastomill, to thereby prepare a carbon-black-containing rubber composition. Thereafter, the carbon-black-containing rubber composition was vulcanized at 160° C. for 12 minutes, to thereby produce carbon-black-containing vulcanized rubber. The resultant carbon-black-containing vulcanized rubber was evaluated for its properties by the evaluation methods (1) to (3) described below. Table 5 shows formulations and evaluation results.

(1) Crack Growth Resistance

The resultant rubber composition was formed into a sheet through calendering, followed by vulcanization by means of a vulcanization-pressing machine at 160° C. for a predetermined period of time, to thereby prepare a crosslinked rubber sheet having a thickness of 2 mm. The resultant sheet was subjected to punching, to thereby prepare test pieces (type IV dumbbell shape) according to ASTM D638. In this case, the sheet was subjected to punching so that the longitudinal direction of the dumbbell was in the calendering direction of the sheet, and a crack was formed in the sheet at its central position in the longitudinal direction of the dumbbell so as to extend in the counter-calendering direction.

Each of the resultant test pieces was subjected to a constant elongation fatigue test under the following conditions: elongation rate: 100%, measurement temperature: 23° C., and rotation speed: 300 cpm. The number of cycles required for breakage of the test piece was counted. A counted value is represented by an index with respect to that (taken as 100) of the rubber composition of Comparative Example 6. A higher index indicates better crack growth resistance.

(2) Rigidity (M300)

The vulcanized rubber was used as a sample for measurement, and subjected to a tensile test according to JIS K6251:2010. A type 3 dumbbell-shaped test sample was used, and the tensile stress at 300% elongation (M300) was measured at room temperature. A measured value is represented by an index with respect to that (taken as 100) of the rubber composition of Comparative Example 2. A higher index indicates better rigidity.

(3) Energy efficiency (50° C. tan δ)

The vulcanized rubber was used as a sample for measurement, and 50° C. tan δ was determined by means of ARES-RDA (manufactured by TA Instruments) under the following conditions: shear strain 1.0%, angular velocity: 100 radians/second, and temperature: 50° C. The obtained value is represented by an index with respect to that (taken as 100) of the rubber composition of Comparative Example 2. A higher index indicates a smaller energy loss and superior low hysteresis loss property.

Example 6 and Comparative Examples 5 to 8

The same kneading operation as performed in Example 5 was repeated, except that the formulation was modified as shown in Table 5 below, to thereby prepare a carbon-black-containing rubber composition. In the same manner as employed in Example 5, the resultant carbon-black-containing rubber composition was used for production of carbon-black-containing vulcanized rubber, and the produced vulcanized rubber was evaluated for its properties. The results are shown in Table 5 below. In Table 5, polybutadiene abbreviations have the following meanings.

S: modified polybutadiene rubber S of Example 3
T: modified polybutadiene rubber T of Example 4
U: modified polybutadiene rubber U of Comparative Example 3
BR01: trade name "BR01," butadiene rubber, manufactured by JSR Corporation
RB840: trade name "RB840," 1,2-polybutadiene, manufactured by JSR Corporation
VCR412: trade name "VCR412," vinyl-cis-polybutadiene (1,2-polybutadiene content: 12.0 mass %), manufactured by Ube Industries, Ltd.

superior to those of the vulcanized rubber of Comparative Example 8. In particular, the vulcanized rubbers of Examples 5 and 6 exhibited considerably improved crack growth resistance. Specifically, the crack growth resistance in Example 5 was about 5.3 times that in Comparative Example 5, 3.3 times that in Comparative Example 6, about 4.3 times that in Comparative Example 7, and about 4.6 times that in Comparative Example 8; and the crack growth resistance in Example 6 was about 4.4 times that in Comparative Example 5, about 2.7 times that in Comparative Example 6, about 3.6 times that in Comparative Example 7, and about 3.9 times that in Comparative Example 8.

As is clear from the aforementioned results, the production method for the polybutadiene rubber composition of the present disclosure can produce vulcanized rubber exhibiting excellent crack growth resistance, and superior fuel efficiency and crack growth resistance.

The invention claimed is:

1. A method for producing a polybutadiene composition comprising 1,2-polybutadiene and 1,4-polybutadiene, the method comprising:
   (X) preparing a reaction mixture comprising 1,2-polybutadiene and an organic solvent by a 1,2-polymerization reaction of 1,3-butadiene in the presence of a cobalt-containing catalyst in the organic solvent,
   (Y) adding a lanthanoid-containing catalyst to the reaction mixture prepared in (X) comprising 1,2-polybutadiene to polymerize 1,3-butadiene by performing cis-1,4-polymerization of 1,3-butadiene in the presence of 1,2-polybutadiene and a lanthanoid-containing catalyst to produce 1,4-polybutadiene,
   wherein the lanthanoid-containing catalyst comprises a lanthanoid compound and an aluminoxane.

2. The method according to claim 1, further comprising:
   terminating a polymerization reaction in (X) by adding an organoaluminum compound to the reaction mixture in (X).

3. The method according to claim 1, wherein the cobalt-containing catalyst comprises a cobalt compound, a phosphine compound, and an organoaluminum compound.

TABLE 5

| Formulations | | Example 5 | Example 6 | Comparative Example 5 | Comparative Example 6 | Comparative Example 7 | Comparative Example 8 |
|---|---|---|---|---|---|---|---|
| | | | | Amount (part(s) by mass) | | | |
| Polybutadiene | S | 60 | — | — | — | — | — |
| | T | — | 60 | — | — | — | — |
| | U | — | — | 60 | — | 54 | — |
| | BR01 | — | — | — | 60 | — | — |
| | RB840 | — | — | — | — | 6 | — |
| | VCR412 | — | — | — | — | — | 60 |
| Natural rubber | | 40 | 40 | 40 | 40 | 40 | 40 |
| Carbon black | | 60 | 60 | 60 | 60 | 60 | 60 |
| Process oil | | 10 | 10 | 10 | 10 | 10 | 10 |
| Stearic acid | | 2 | 2 | 2 | 2 | 2 | 2 |
| Antioxidant | | 1 | 1 | 1 | 1 | 1 | 1 |
| Zinc oxide | | 3 | 3 | 3 | 3 | 3 | 3 |
| Vulcanization promoter | | 1 | 1 | 1 | 1 | 1 | 1 |
| Sulfur | | 1.2 | 1.2 | 1.2 | 1.2 | 1.2 | 1.2 |
| | | | | Evaluation | | | |
| Crack growth resistance | | 330 | 278 | 62 | 100 | 77 | 71 |
| M300 | | 130 | 130 | 107 | 100 | 126 | 147 |
| Energy efficiency | | 124 | 121 | 120 | 100 | 124 | 91 |

As shown in Table 5, the carbon-black-containing vulcanized rubbers of Examples 5 and 6 exhibited rigidity, fuel efficiency, and crack growth resistance superior to those of the vulcanized rubbers of Comparative Examples 5 and 6. The carbon-black-containing vulcanized rubbers of Examples 5 and 6 exhibited crack growth resistance superior to that of the vulcanized rubber of Comparative Example 7, and exhibited fuel efficiency and crack growth resistance 4. The method according to claim 1, wherein the 1,2-polybutadiene is 1,2-syndiotactic polybutadiene.

5. The method according to claim 1, wherein the lanthanoid-containing catalyst further comprises a halogen compound.

6. The method according to claim 1, wherein in (Y) 1,4-polybutadiene having active ends is produced; and
the method further comprises (Z) reacting the active ends of 1,4-polybutadiene with an alkoxysilane compound.

7. The method according to claim 1, wherein the polybutadiene composition comprises from 5 to 30 mass % of 1,2-polybutadiene.

8. A crosslinked product produced by crosslinking a rubber composition comprising a polybutadiene composition produced by the method of claim 1.

* * * * *